(12) United States Patent
Keller et al.

(10) Patent No.: US 9,457,627 B1
(45) Date of Patent: Oct. 4, 2016

(54) HANDHELD INTERROGATION AND DISPLAY FOR REMOTE SENSORS

(71) Applicant: GOODRICH CORPORATION, Charlotte, NC (US)

(72) Inventors: Steven Keller, Union, OH (US); Paul L. Summers, Troy, OH (US); Scott Streng, Troy, OH (US); Eric Stein, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 14/687,722

(22) Filed: Apr. 15, 2015

(51) Int. Cl.
*B60C 23/00* (2006.01)
*B60C 23/04* (2006.01)
*B64C 25/34* (2006.01)

(52) U.S. Cl.
CPC .......... *B60C 23/0479* (2013.01); *B64C 25/34* (2013.01)

(58) Field of Classification Search
CPC ................................. B60C 23/0413

USPC ................................. 340/442–448
See application file for complete search history.

(56) References Cited

U.S. PATENT DOCUMENTS

| | | | |
|---|---|---|---|
| 5,483,827 A * | 1/1996 | Kulka et al. ................. | 73/146.5 |
| 7,202,778 B2 * | 4/2007 | Buenz et al. ................. | 340/448 |
| 7,924,147 B2 | 4/2011 | Mathias et al. | |
| 8,576,059 B2 | 11/2013 | Rigney et al. | |
| 2006/0164214 A1 * | 7/2006 | Bajahr ................ | B60C 23/0413 340/10.41 |

* cited by examiner

*Primary Examiner* — Brent Swarthout
(74) *Attorney, Agent, or Firm* — Snell & Wilmer LLP

(57) ABSTRACT

A handheld interrogation device includes a controller configured to generate a power signal. The controller is also configured to determine tire pressure data based on a signal received from a tire pressure sensor. The handheld interrogation device also includes a primary coil coupled to the handheld interrogation device and configured to transmit the power signal to a sensor coil of the tire pressure sensor and to receive a data signal from the sensor coil, via inductive coupling, in response to the primary coil being within a predetermined distance of the sensor coil.

19 Claims, 5 Drawing Sheets

HANDHELD INTERROGATION AND DISPLAY FOR REMOTE SENSORS

FIELD

The present disclosure relates to a tire pressure sensing system, and more particularly to a handheld device for powering and receiving information wirelessly from a tire pressure sensor.

BACKGROUND

Aircraft may include landing gear having wheels for supporting the weight of the aircraft while the aircraft is in contact with the ground. A tire may be coupled to each wheel of each landing gear defining a volume that may be pressurized. Each wheel may include a tire pressure sensor. In some aircraft, a control unit may be coupled to each of the tire pressure sensors for powering the tire pressure sensor and for receiving informational data from the tire pressure sensor. Some aircraft, however, do not include a control unit coupled to each of the tire pressure sensors.

SUMMARY

According to various embodiments, a handheld interrogation device includes a controller configured to generate a power signal. The controller is also configured to determine tire pressure data based on a signal received from a tire pressure sensor. The handheld interrogation device also includes a primary coil coupled to the handheld interrogation device and configured to transmit the power signal to a sensor coil of the tire pressure sensor and to receive a data signal from the sensor coil, via inductive coupling, in response to the primary coil being within a predetermined distance of the sensor coil.

Also described is a system in accordance with various embodiments including a tire pressure sensor configured to detect tire pressure data and generate a data signal including the tire pressure data in response to receiving a power signal. The tire pressure sensor includes a sensor coil. The system also includes a handheld interrogation device that includes a controller. The controller is adapted to generate the power signal and demodulate the data signal. The handheld interrogation device also includes a primary coil coupled to the handheld interrogation device and configured to transmit the power signal to the sensor coil and to receive the data signal from the sensor coil, via inductive coupling, in response to the primary coil being within a predetermined distance of the sensor coil.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
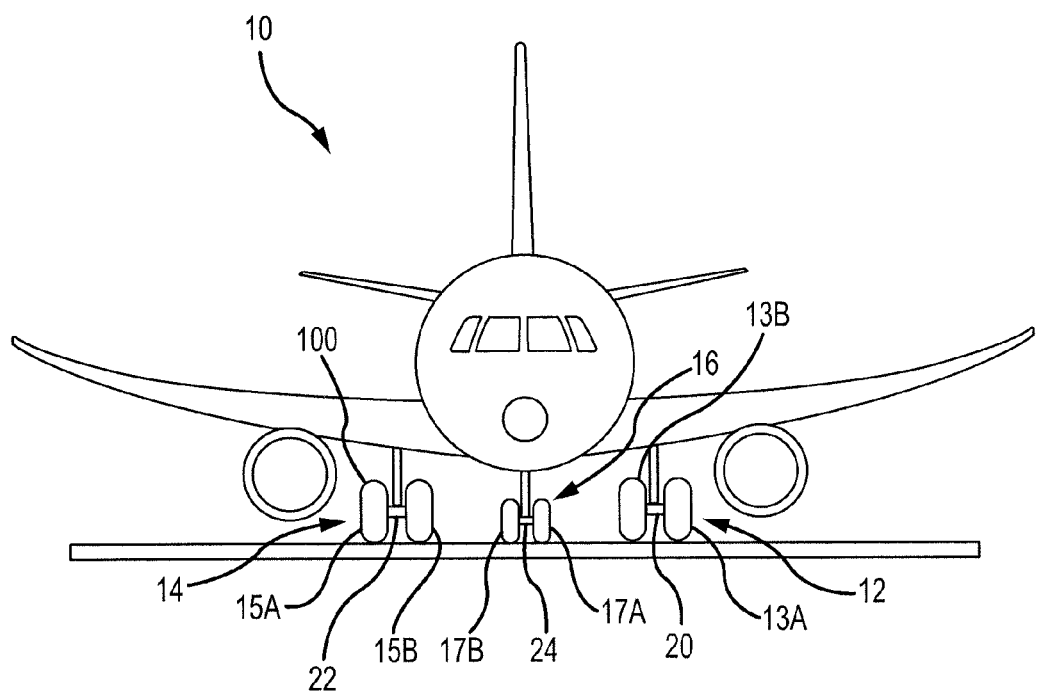
FIG. 1 illustrates an aircraft having landing gear, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by a strut 20; landing gear 14 may include wheel 15A and wheel 15B coupled by a strut 22; and landing gear 16 may include nose wheel 17A and nose wheel 17B coupled by a strut 24. The nose wheels differ from the main wheels in that the nose wheels may not include a brake and/or a wheel speed transducer.

Wheel 15A may be coupled to a tire, such that the tire and the wheel define a pressurizable volume. Wheel 15A or the tire may receive and/or house a tire pressure sensor 100 that includes at least a portion within the pressurizable volume such that tire pressure sensor 100 may detect data corresponding to a pressure within the pressurizable volume.

Figure 2:
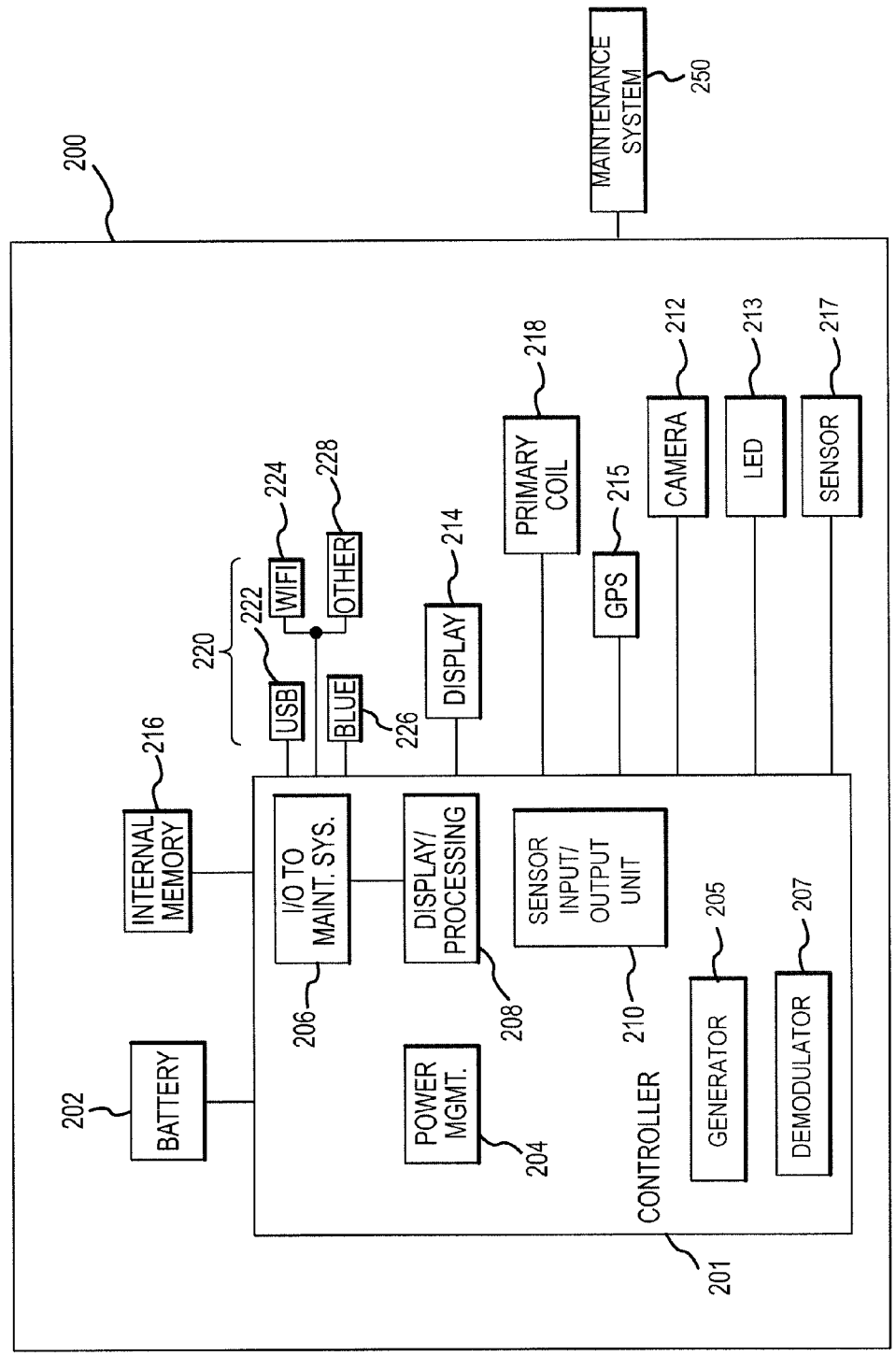
FIG. 2 is a block diagram of a handheld interrogation device, in accordance with various embodiments.

In various embodiments, tire pressure sensor 100 may be a stand-alone device. In that regard and with reference to FIGS. 1 and 2, a handheld interrogation device 200 may be used by a maintenance worker for powering and querying tire pressure sensor 100. Handheld interrogation device 200 in accordance with various embodiments may be positioned adjacent tire pressure sensor 100 (i.e., within 1 inches (2.54 cm), within 3 inches (7.62 cm) or within 6 inches (15.24 cm)) and wirelessly power tire pressure sensor 100 and/or receive data detected by tire pressure sensor 100 (hereinafter, "tire pressure data"), such as a tire pressure, a temperature, a health of tire pressure sensor 100 (wherein health may refer to whether tire pressure sensor 100 is in an acceptable condition or not), a serial number of tire pressure sensor 100, a serial number of the tire coupled to wheel 15A, a serial number of wheel 15A, a version of software used by tire pressure sensor 100, a part number of tire pressure sensor 100, a build date of the software of tire pressure sensor 100, an assembly date of tire pressure sensor 100, dates that tire pressure sensor 100 have been calibrated, data regarding aircraft 10 such as location data and/or identification data, other health information such as proactive maintenance information and/or the like.

Handheld interrogation device 200 may include a battery 202, a controller 201, a camera 212, a light emitting diode (LED) 213, a plurality of input/output ports 220, a tangible, non-transitory internal memory 216, a display 214, a primary coil 218 a global positioning system (GPS) unit 215 and a sensor 217.

Battery 202 may be capable of storing power. In that regard, components of handheld interrogation device 200 may operate based on power received from battery 202. In various embodiments, battery 202 may be a disposable battery, a rechargeable battery, a super capacitor or a combination of the three.

Controller 201 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

Controller 201 may include a power management unit 204, a system input/output unit 206 configured to communicate with a maintenance system, a display processing unit 208, a variable frequency generator 205, a demodulator 207 and a sensor input/output unit 210 capable of communicating with tire pressure sensor 100.

Power management unit 204 may be capable of managing the distribution of power from battery 202. In that regard, power management unit 204 may be coupled to battery 202 and to other components of handheld interrogation device 200 such that it can receive power from battery 202 and distribute power to the other components of handheld interrogation device 200. In various embodiments, power management unit 204 may control the distribution of power without being connected to the power lines.

Power management unit 204 may also control the charging of battery 202 if battery 202 is rechargeable. Handheld interrogation device 200 may be adapted to be electronically coupled to a charging station in order to receive power for charging battery 202. The charging station may be adapted to receive direct current (DC) or alternating current (AC) power of any voltage and/or frequency.

System input/output unit 206 may be coupled to at least one of the plurality of input/output ports 220 and capable of communicating with a maintenance system 250 via at least one of the plurality of input/output ports 220. Maintenance system 250 may be operated in a location remote from aircraft 10 and may include maintenance information corresponding to a plurality of wheels and/or tires for one or more aircraft in one or more locations. In that regard, maintenance system 250 may be capable of receiving information from tire pressure sensors via handheld interrogation device 200.

Each tire pressure sensor may include a unique identifier. In that regard, maintenance system 250 may catalog information regarding each tire pressure sensor such as tire pressures at various times and locations, which tire and/or aircraft each tire pressure sensor is positioned on, map data corresponding to various locations of each tire pressure sensor, the age of each tire or the like. This capability allows maintenance system 250 to monitor aircraft, positions, tires and mating wheel information for determining reasons for damage to tires.

Maintenance system 250 may store and analyze the received data from the various tire pressure sensors. In that regard, maintenance system 250 may be capable of cataloging the tire pressure data for each particular tire/wheel, for each aircraft and/or for a full fleet of aircraft. Maintenance system 250 may analyze the received data and produce charts and/or graphs that interactively track tire pressures, usage and, in various embodiments, tire wear. In various embodiments, controller 201 may be capable of analyzing the data, producing the charts and/or producing the graphs. In various embodiments, key data, including historical tire pressure values and/or potential issues with each tire pressure sensor, may be transmitted to handheld interrogation device 200 from maintenance system 250.

Display processing unit 208 may be capable of controlling information to be displayed on display 214. In that regard, display processing unit 208 may receive data, convert the data to displayable data and instruct display 214 to display the displayable data.

Variable frequency generator 205 may be capable of generating a power signal (in the form of a variable frequency power signal). Demodulator 207 may be capable of demodulating (i.e., decoding) a modulated signal. Stated differently, demodulator 207 is capable of receiving an analog signal having a modulated digital component and removing the modulation from the analog signal.

Sensor input/output unit 210 may be capable of controlling data and/or power communication between handheld interrogation device 200 and tire pressure sensor 100. In that regard, tire pressure sensor 100 may not be coupled to a power source other than handheld interrogation device 200. Accordingly, controller 201 may transmit the power signal generated in variable frequency generator 205 to tire pressure sensor 100. Tire pressure sensor 100 may receive the power signal and apply the power to its components. In response to receiving the power, tire pressure sensor 100 may detect tire pressure data and transmit the tire pressure data to handheld interrogation device 200. Demodulator 207 may receive the modulated tire pressure data signal and demodulate the modulated tire pressure data signal.

In various embodiments, controller 201 may be capable of communicating with tire pressure sensor 100. For example, controller 201 may request particular data from tire pressure sensor, may be used to program or reprogram tire pressure sensor or may be used to configure tire pressure sensor 100 such as providing a tire serial number, a wheel serial number, an aircraft serial number and/or the like.

In various embodiments, controller 201 may also be capable of determining a status of tire pressure sensor 100. For example, controller 201 may be capable of determining if tire pressure sensor 100 is functioning other than as desired, is experiencing errors, has gone beyond its operating limit conditions (such as exceeding a temperature limit), requires replacement or the like.

Primary coil 218 may be capable of wireless electrical connection with tire pressure sensor 100. In that regard, tire pressure sensor 100 may also include a sensor coil. In order to electrically couple handheld interrogation device 200 to tire pressure sensor 100, primary coil 218 may be positioned adjacent sensor coil 102 (see FIG. 3A) of tire pressure sensor 100, causing primary coil 218 and sensor coil 102 of tire pressure sensor 100 to function in a similar manner as a transformer. Stated differently, primary coil 218 may have an AC signal which creates a varying magnetic flux around sensor coil 102. In response to the varying magnetic flux, sensor coil 102 of tire pressure sensor 100 may be subject to a varying magnetic field in response to being within a predetermined distance of primary coil 218. This varying magnetic field generates a varying voltage signal in sensor coil 102 of tire pressure sensor 100. Thus, primary coil 218 and sensor coil 102 of tire pressure sensor 100 can communicate power signals and data signals in both directions via inductive coupling. In various embodiments, handheld interrogation device 200 may communicate with tire pressure sensor 100 via another wireless system, such as IEEE standard 802.15.1 (Bluetooth), IEEE standard 802.11 (WI-FI) or the like.

In various embodiments, a tire pressure sensor may include a physical connector instead of or in addition to a coil. In that regard, handheld interrogation device 200 may also include a physical connector capable of communicating with the physical connector of the tire pressure sensor via direct electrical contacts. For example, a cable may be coupled to both physical connectors and allow transmission of electronic signals between the tire pressure sensor and handheld interrogation device 200. As another example, coil 102 may instead include a connector having pins and/or slots configured to interface with other slots and/or pins. Similarly, primary coil 218 may include a connector having pins and/or slots. The pins and/or slots of tire pressure sensor 100 may contact the pins and/or slots of handheld interrogation device 200, allowing electronic signals to transfer between tire pressure sensor 100 and handheld interrogation device 200.

Sensor input/output unit 210 may be capable of modulating a power signal and transmitting the modulated power signal to primary coil 218. In response to the coils being positioned near each other, power may be transferred between primary coil 218 and the sensor coil of tire pressure sensor 100. Similarly, sensor input/output unit 210 may be capable of modulating and/or demodulating sent and/or received data signals.

Memory 216 may be a non-transitory memory capable of storing data. In various embodiments, memory 216 may or may not be separate from the memory of controller 201. In that regard, memory 216 may store instructions to be executed by controller 201 and/or may store data received by handheld interrogation device 200 from tire pressure sensor 100 and/or from the maintenance system.

In various embodiments, handheld interrogation device 200 may be capable of storing and cataloging data corresponding to each tire pressure sensor for which it detects data. In that regard, memory 216 may be capable of storing the detected data. In various embodiments, memory 216 may store data until, handheld interrogation device 200 can communicate with the maintenance system, at which time some or all the stored data may be transferred to the maintenance system and/or removed from memory 216.

Data stored in memory 216 may be encrypted and/or unencrypted. Additionally, any data transmitted via system input/output unit 206 and/or via sensor input/output unit 210 may be encrypted and/or unencrypted. In various embodiments, a device remote from handheld interrogation device 200 may be capable of establishing a communication with handheld interrogation device 200. The remote device may be capable of initiating a data wipe and/or initialization of other security measures in case of loss or theft of handheld interrogation device 200.

The plurality of input/output ports 220 may include a Universal Serial Bus ("USB") port 222, a WI-FI port 224, a Bluetooth port 226, an Ethernet port and/or any other input/output port 228. Handheld interrogation device 200 may communicate with the maintenance system via any of the plurality of input/output ports 220.

GPS unit 215 may include any GPS device capable of receiving a GPS signal. In that regard, GPS unit 215 may be used by controller 201 to determine an estimated position of handheld interrogation device. In various embodiments, the maintenance system and/or handheld interrogation device 200 may determine and catalog which aircraft and/or tire pressure sensors have been monitored based on location data detected by GPS unit 215.

Display 214 may be a display positioned on handheld interrogation device 200 and capable of displaying information. For example, display 214 may display data received from tire pressure sensor 100. In response to handheld interrogation device 200 being paired with a tire pressure sensor, display 214 may display the current readings, sensor historical values and/or position of the tire pressure sensor relative to an aircraft. Similarly, display 214 may display data received from the maintenance system such as navigation instructions, a list of wheels/tires to be monitored or the like.

In various embodiments, display 214 may or may not display color data. Display 214 may have an adjustable light intensity that can be adjusted manually and/or automatically. This allows display 214 to be viewable in direct sunlight as well as in the dark.

To facilitate monitoring of multiple tire pressure sensors, the maintenance system may determine a current location of handheld interrogation device 200 based on the GPS data. Based on the current location and the location of the aircraft to be monitored, the maintenance system and/or handheld interrogation device 200 may plan a route to each of the aircraft to be monitored. The route may be determined such that the aircraft are monitored in an efficient manner. For example, the maintenance system may plan a route that reduces backtracking by a user of handheld interrogation device 200, that reduces crossings of taxi ways that ensures that aircraft will be monitored prior to a planned departure time and/or the like. In that regard, display 214 may display navigation instructions corresponding to the route.

In various embodiments, handheld interrogation device 200 may include a system instructing the maintenance worker to go to specific wheels or tail numbers of aircraft. These instructions may be programmed into handheld interrogation device 200 or may be transmitted to handheld interrogation device 200 wirelessly.

Similarly, handheld interrogation device 200 may receive data regarding aircraft 10. For example, an operator may input data regarding the aircraft, such as flight times, service locations or the like. As another example, handheld interrogation device 200 may receive data directly from aircraft 10 from an automated system. Handheld interrogation device 200 may receive this information via a port or any other connection to aircraft 10.

Camera 212 may be capable of detecting image data. In that regard, camera 212 may detect image data including the location of handheld interrogation device 200 relative to tire pressure sensor 100, a serial number or other identifying information of the corresponding wheel or tire or the like. In various embodiments, camera 212 may detect video data that may be transferred to a worker, such as a supervisor, who may supervise the monitoring of the aircraft. Camera 212 may also grant maintenance personnel a better perspective regarding the location of primary coil 218 relative to sensor coil 102. This may be particularly useful when tire pressure sensor 100 is positioned in a location from which reaching a vantage point is difficult or uncomfortable.

In various embodiments, camera 212, in combination with controller 201, may be capable of detecting patterns, such as a barcode, in order to determine part numbers and/or serial numbers of tire pressure sensors and/or tires. This allows the maintenance system and/or handheld interrogation device 200 to more easily catalog data corresponding to each tire pressure sensor and/or tire after detection by handheld interrogation device 200. In various embodiments, handheld interrogation device 200 may include a radio frequency identification (RFID) scanner capable of detecting RFID data. The RFID scanner may be capable of detecting part numbers and/or serial numbers of tire pressure sensors, wheels and/or tires that are stored in an RFID tag.

In various embodiments, the maintenance system and/or handheld interrogation device 200 may determine and catalog which aircraft and/or tire pressure sensors have been monitored based on image data. For example, controller 201 may use GPS data to determine a location of handheld interrogation device and data detected by camera 212 to identify the tire or tire pressure sensor. Controller 201 may then correlate the location and the identity.

Sensor 217 may include one or more of the following: a temperature sensor, an air pressure sensor, a moisture or humidity sensor, a gas detector or other chemical sensor, a sound sensor, a pH sensor, a smoke detector, a metal detector, a 1, 2, 3 or more axis accelerometer, an actinometer, an altimeter, a depth gauge, a compass, a radiation sensor, a motion detector, or other sensor. Sensor 217 allows handheld interrogation device 200 to determine ambient conditions when receiving tire pressure data from tire pressure sensor 100. The ambient conditions may be logged in the maintenance system and/or handheld interrogation device 200 along with the tire pressure data.

LED 213 may be an LED or other light source used to generate light for increasing the ability of a user to determine where to position handheld interrogation device relative to each wheel and/or tire. In various embodiments, LED 213 may be an infrared LED (IRLED) such that it can be used by individuals wearing night vision goggles. In various embodiments, LED 213 may generate light of any color such as white and/or other colors that prevent interference with night vision goggles or a maintenance worker's night vision due to pupil dilation (such as a red or a blue light).

In various embodiments, handheld interrogation device 200 may include an input device such as a microphone, a keyboard, a touch screen, buttons and/or the like. This may allow a user of handheld interrogation device 200 to enter notes regarding tire pressure data.

Figure 3A:
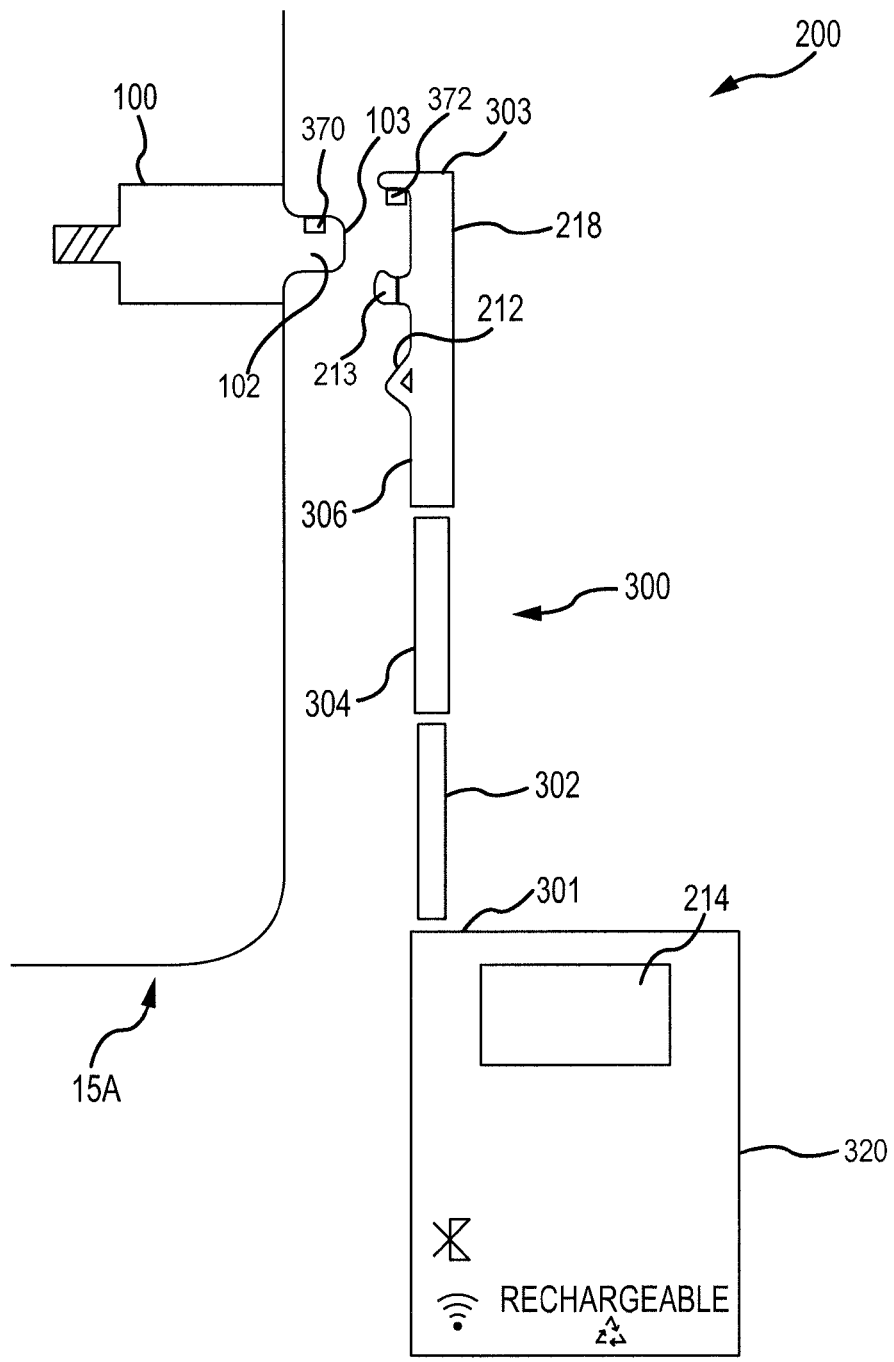
FIG. 3A illustrates the handheld interrogation device of FIG. 2 having a primary coil adjacent a sensor coil of a tire pressure sensor, in accordance with various embodiments.

With reference now to FIG. 3A, tire pressure sensor 100, in accordance with various embodiments, of wheel 15A may have a sensor coil 102 positioned in a housing 103. When data is to be received from tire pressure sensor 100, handheld interrogation device 200 may be positioned such that primary coil 218 is located proximate sensor coil 102. In that regard, handheld interrogation device 200 may be capable of communicating with tire pressure sensor 100 in response to sensor coil 102 being within a predetermined distance of primary coil 218. The predetermined distance may be, for example, within one inch (25.4 mm), within three inches (76.2 mm) or within six inches (152.4 mm). In response to primary coil 218 being farther than the predetermined distance from sensor coil 102, a minimal amount of data may be communicated. In that regard and with reference to FIGS. 1 and 3A, the predetermined distance provides an advantage over current technology. For example, when handheld interrogation device 200 is interrogating tire pressure sensor 100 of wheel 15A, a tire pressure sensor of wheel 15B may not cause interference with the communication between handheld interrogation device 200 and tire pressure sensor 100 of wheel 15A. This ensures that data detected by handheld interrogation device 200 is accurate and being received from the desired tire pressure sensor.

In various embodiments and with renewed reference to FIG. 3A, handheld interrogation device 200 may include a body 320. Body 320 may house some or all of the components of handheld interrogation device. In various embodiments, body 320 may hermetically seal components of handheld interrogation device 200 such that the components are sealed from environmental exposure. In that regard, body 320 may be resistant to sudden force such that the components may withstand being dropped by a user. Similarly, body 320 may be resistant to moisture such that limited moisture may enter body 320.

Handheld interrogation device 200 may include an arm 300 having a first end 301 proximal body 320 and a second end 303 distal body 320. Primary coil 218 may be positioned near second end 303. In that regard, the length of arm 300 provides for easier placement of primary coil 218 relative to tire pressure sensor 100.

Tire pressure sensor 100 may include a sensor connector 370, such as a cavity, a hook, a bayonet mount, a press-fit connector, a snap connector or the like. Handheld interrogation device 200 may also include a handheld connector 372 capable of mechanically connecting to sensor connector 370. In response to sensor connector 370 being connected to handheld connector 372, primary coil 218 is positioned adjacent sensor coil 102 such that primary coil 218 and sensor coil 102 may function as a transformer, allowing signals to propagate between them. In that regard, handheld interrogation device 200 may detect tire pressure data while sensor connector 370 is connected to handheld connector 372. Handheld interrogation device 200 may also be capable of generating feedback, such as audio data or image data, in response to the pressure of the tire coupled to wheel 15A reaching a predetermined tire pressure.

Because the tire may be filled while sensor connector is coupled to handheld connector, handheld interrogation device 200 may detect tire pressures of the tire while the tire is being pressurized. Handheld interrogation device 200 may then output the feedback in response to the tire reaching a predetermined pressure.

In various embodiments, arm 300 may include a first portion 302, a second portion 304, and a third portion 306. First portion 302, second portion 304 and third portion 306 may be telescoping such that at least part of third portion 306 may overlap with at least part of second portion 304 and at least part of second portion 304 may overlap with at least part of first portion 302. In various embodiments, arm 300 may not be telescoping. In various embodiments, a handheld interrogation device may not include an arm 300. For example, a coil may be positioned elsewhere on a handheld interrogation device such that a body of the handheld interrogation device is to be held adjacent sensor coil 102.

Camera 212 may be positioned near primary coil 218. In that regard, camera 212 may be used to detect image data corresponding to the location of primary coil 218 relative to sensor coil 102. Camera 212 may also be used by a user of handheld interrogation device 200 to align primary coil 218 with sensor coil 102. Display 214 may display image data detected by camera 212 so that the user can adjust the position of primary coil 218 relative to sensor coil 102. Similarly, LED 213 may be positioned near primary coil 218 such that LED 213 may illuminate an area near primary coil 218.

Figure 3B:
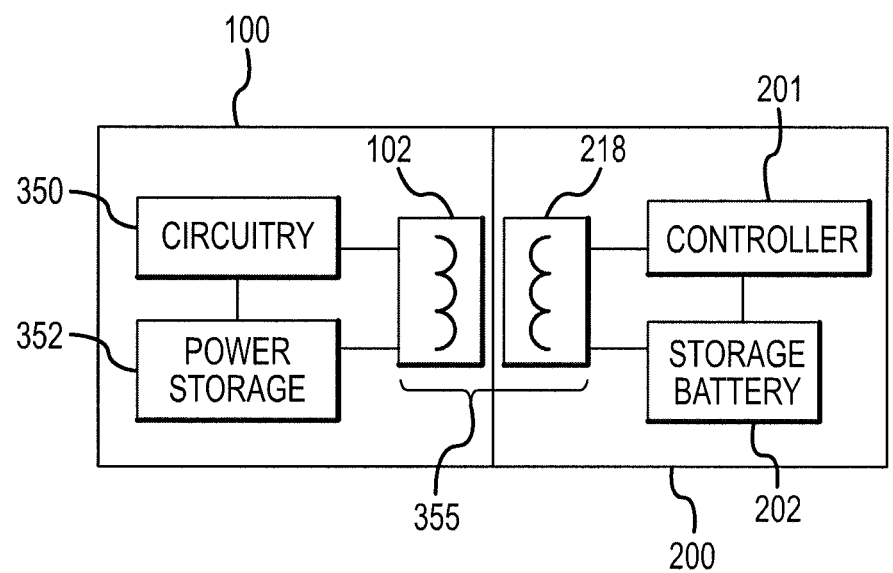
FIG. 3B is a block diagram of the handheld interrogation device and the tire pressure sensor of FIG. 3A, in accordance with various embodiments.

With reference now to FIG. 3B, tire pressure sensor 100 in accordance with various embodiments may include circuitry 350, power storage 352 and sensor coil 102. Power storage 352 of tire pressure sensor 100 may be a temporary power storage device such as one or more capacitors. Circuitry 350 may include components capable of distributing power, detecting data and transmitting the detected data. In that regard, sensor coil 102 can transfer and/or receive power from power storage 352 and transmit and/or receive data signals from circuitry 350.

Handheld interrogation device 200 includes controller 201, battery 202 and primary coil 218. In response to sensor coil 102 being positioned proximate primary coil 218, sensor coil 102 and primary coil 218 may function together as a transformer 355. In that regard, power and/or information signals may be transferred between tire pressure sensor 100 and handheld interrogation device 200 via transformer 355 without a physical conductive connection. This is advantageous as sensor coil 102 can be hermetically sealed within housing 103 of tire pressure sensor 100. This reduces an amount of environmental exposure of sensor coil 102, thus extending the life of tire pressure sensor 100. Similarly, primary coil 218 may be hermetically sealed within handheld interrogation device 200, thus reducing exposure to environmental elements of components of handheld interrogation device 200. This similarly increases the life of handheld interrogation device 200.

Figure 4:
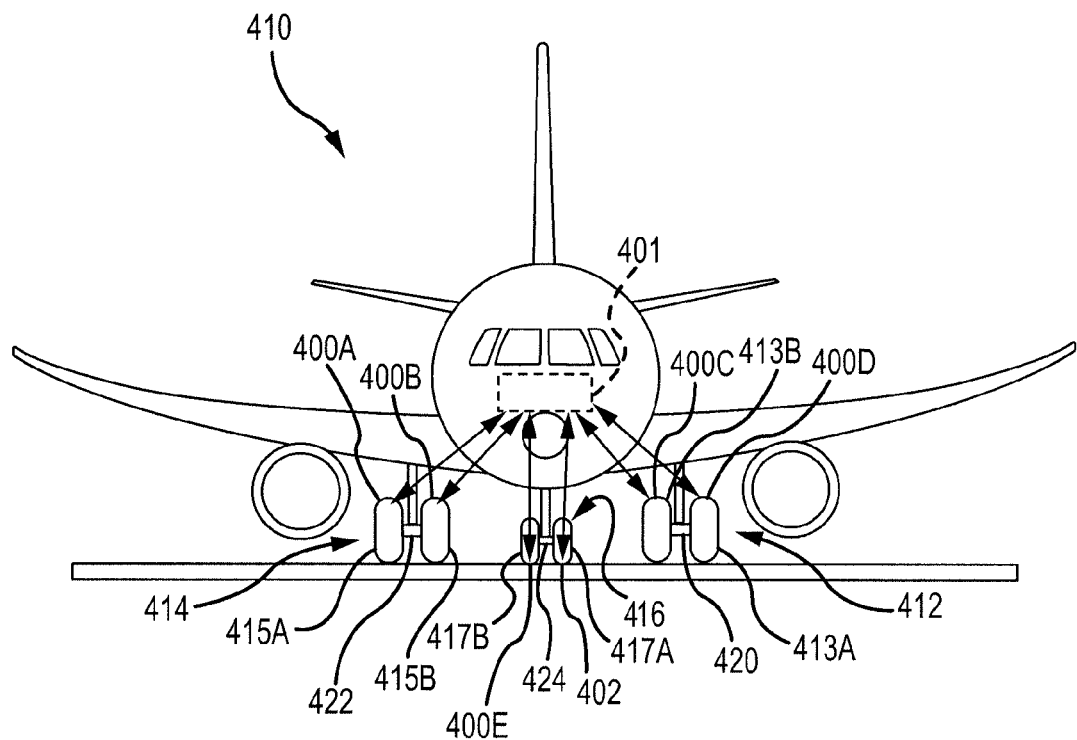
FIG. 4 illustrates an aircraft having landing gear that includes wheels having tire pressure sensors and a communication unit coupled to each of the tire pressure sensors, in accordance with various embodiments.

With reference now to FIG. 4, an aircraft 410 in accordance with various embodiments may include landing gear such as landing gear 412, landing gear 414 and landing gear 416. Landing gear 412 may include wheel 413A and 413B coupled by a strut 420; landing gear 414 may include wheel 415A and wheel 415B coupled by a strut 422; landing 416 may include nose wheel 417A and nose wheel 417B coupled by a strut 424.

Each of the wheels and the nose wheels may be coupled to a tire such that each wheel and nose wheel and tire pair forms a pressurizable volume. Wheel 415A may include a tire pressure sensor 400A, wheel 415B may include a tire pressure sensor 400B, wheel 413B may include a tire pressure sensor 400C, wheel 413A may include a tire pressure sensor 400D and nose wheel 417B may include a tire pressure sensor 400E. The tire pressure sensors may be coupled to a communication unit 401 that is capable of receiving data detected by each of the tire pressure sensors.

Nose wheel 417A may include a tire pressure sensor 402. Tire pressure sensor 402 may similarly be coupled to communication unit 401 and capable of transmitting and/or receiving data from communication unit 401. Tire pressure sensor 402 may include a coil and thus be capable of communicating with a handheld interrogation device, such as handheld interrogation device 200. Tire pressure sensor 402 may transmit data regarding the pressure corresponding to wheel 417A. Similarly, tire pressure sensor 402 may transmit data to the handheld interrogation device regarding the tire pressure sensor of each of the other wheels and nose wheels. In that regard, tire pressure data for each of aircraft 410 may be detected by the handheld interrogation device by electronically coupling the handheld interrogation device to tire pressure sensor 402. In various embodiments, tire pressure sensor 402 may be positioned on any wheel or nose wheel of aircraft 410.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A handheld interrogation device comprising:
   a controller configured to:
      generate a power signal, and
      determine tire pressure data based on a signal received from a tire pressure sensor;
   a primary coil coupled to the handheld interrogation device and configured to transmit the power signal to a sensor coil of the tire pressure sensor and to receive a data signal from the sensor coil, via inductive coupling, in response to the primary coil being within a predetermined distance of the sensor coil; and
an input/output port configured to allow the controller to communicate with a maintenance system.

2. The handheld interrogation device of claim 1, further comprising a display configured to output the tire pressure data.

3. The handheld interrogation device of claim 2, wherein the display is further configured to output sensor historical values.

4. The handheld interrogation device of claim 3, wherein the display is further configured to output the tire pressure data and the sensor historical values in graphical format.

5. The handheld interrogation device of claim 1, further comprising a demodulator configured to demodulate the data signal received from the tire pressure sensor.

6. The handheld interrogation device of claim 1, wherein the power signal is a variable frequency power signal.

7. The handheld interrogation device of claim 1, further comprising a global positioning system (GPS) unit such that the controller can determine a current position of the handheld interrogation device.

8. The handheld interrogation device of claim 7, further comprising a display configured to output a route to a plurality of aircraft to be monitored by the handheld interrogation device, the route being based on the current position.

9. The handheld interrogation device of claim 1, further comprising a camera configured to detect image data corresponding to the tire pressure sensor.

10. The handheld interrogation device of claim 1, wherein the tire pressure data includes the tire pressure data corresponding to the tire pressure sensor and at least another tire pressure sensor.

11. The handheld interrogation device of claim 1, wherein the controller is further configured to generate data to be transmitted to the tire pressure sensor via the primary coil and the sensor coil, the data including at least one of configuration data, aircraft data or data used to reprogram the tire pressure sensor.

12. The handheld interrogation device of claim 1, further comprising a handheld connector configured to mechanically couple to a sensor connector of the tire pressure sensor such that the primary coil is positioned within the predetermined distance of the sensor coil in response to the handheld connector being coupled to the sensor connector and such that the controller may determine the tire pressure data while a tire is being pressurized.

13. A system comprising:
a tire pressure sensor configured to detect tire pressure data and generate a data signal including the tire pressure data in response to receiving a power signal, the tire pressure sensor including a sensor coil; and
a handheld interrogation device including:
a controller configured to:
generate the power signal, and
demodulate the data signal;
a camera configured to detect image data corresponding to the tire pressure sensor; and
a primary coil coupled to the handheld interrogation device and configured to transmit the power signal to the sensor coil and to receive the data signal from the sensor coil, via inductive coupling, in response to the primary coil being within a predetermined distance of the sensor coil.

14. The system of claim 13, further comprising a communication unit coupled to the tire pressure sensor and a second tire pressure sensor and configured to receive a second tire pressure data from the second tire pressure sensor, wherein the data signal further includes the second tire pressure data.

15. A handheld interrogation device comprising:
a global positioning system (GPS) unit configured to detect location data;
a controller configured to:
determine a current location of the handheld interrogation device based on the location data,
generate a power signal, and
determine tire pressure data based on a signal received from a tire pressure sensor; and
a primary coil coupled to the handheld interrogation device and configured to transmit the power signal to a sensor coil of the tire pressure sensor and to receive a data signal from the sensor coil, via inductive coupling, in response to the primary coil being within a predetermined distance of the sensor coil.

16. The handheld interrogation device of claim 15, further comprising a display configured to output a route to a plurality of aircraft to be monitored by the handheld interrogation device, the route being based on the current position.

17. The handheld interrogation device of claim 15, further comprising a camera configured to detect image data corresponding to the tire pressure sensor.

18. The handheld interrogation device of claim 15, further comprising a handheld connector configured to mechanically couple to a sensor connector of the tire pressure sensor such that the primary coil is positioned within the predetermined distance of the sensor coil in response to the handheld connector being coupled to the sensor connector and such that the controller may determine the tire pressure data while a tire is being pressurized.

19. The handheld interrogation device of claim 15, wherein the power signal is a variable frequency power signal.

* * * * *